United States Patent
Prasad et al.

(10) Patent No.: US 11,801,770 B2
(45) Date of Patent: Oct. 31, 2023

(54) CHARGING ARCHITECTURE FOR RECONFIGURABLE BATTERY PACK USING SOLID-STATE AND CONTACTOR SWITCHES

(71) Applicant: GM GLOBAL TECHNOLOGY OPERATIONS LLC, Detroit, MI (US)

(72) Inventors: Rashmi Prasad, Troy, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 886 days.

(21) Appl. No.: 16/570,227

(22) Filed: Sep. 13, 2019

(65) Prior Publication Data

US 2021/0078442 A1   Mar. 18, 2021

(51) Int. Cl.
| | |
|---|---|
| B60L 58/00 | (2019.01) |
| B60L 58/19 | (2019.01) |
| B60L 58/18 | (2019.01) |
| H02P 27/06 | (2006.01) |
| B60L 3/04 | (2006.01) |
| B60L 53/16 | (2019.01) |
| B60L 53/62 | (2019.01) |
| B60L 3/00 | (2019.01) |
| B60L 53/18 | (2019.01) |
| H02J 7/00 | (2006.01) |

(52) U.S. Cl.
CPC ............. *B60L 58/19* (2019.02); *B60L 3/0046* (2013.01); *B60L 3/04* (2013.01); *B60L 53/16* (2019.02); *B60L 53/18* (2019.02); *B60L 53/62* (2019.02); *B60L 58/18* (2019.02); *H02J 7/0024* (2013.01); *H02P 27/06* (2013.01); *H02J 2310/48* (2020.01)

(58) Field of Classification Search
CPC .......... B60L 58/19; B60L 58/18; B60L 53/62; B60L 53/16; B60L 53/18; B60L 53/04; B60L 53/0046; H02J 7/0024; H02P 27/06
See application file for complete search history.

(56) References Cited

U.S. PATENT DOCUMENTS

| | | | |
|---|---|---|---|
| 7,643,256 B2 * | 1/2010 | Wright ................... | H01H 9/541 361/13 |
| 8,129,952 B2 * | 3/2012 | Lee ......................... | B60L 3/003 320/140 |

(Continued)

*Primary Examiner* — Hau V Phan
(74) *Attorney, Agent, or Firm* — Quinn IP Law

(57) ABSTRACT

A battery system includes first and second battery packs connected to positive and negative DC voltage bus rails, a contactor switch connected between the battery packs, a solid-state switch in series with the contactor switch, and a controller. The controller determines characteristic values of the switches, including a respective temperature, voltage, and current value for each. The controller also detects a predetermined electrical fault condition of the contactor switch using the characteristic values, and executes a control action in response to the electrical fault condition. The control action includes opening the semi-conductor switch to thereby interrupt a flow of current between the first and second battery packs. A mobile platform includes road wheels connected to a body, a rotary electric machine configured to power the road wheels and thereby propel the mobile platform, and the battery pack, switches, and controller.

20 Claims, 6 Drawing Sheets

(56) References Cited

U.S. PATENT DOCUMENTS

| | | | | |
|---|---|---|---|---|
| 8,288,992 B2* | 10/2012 | Kramer | ............... | H02J 7/0016 320/121 |
| 8,294,426 B2* | 10/2012 | Kosugi | ............... | G01R 31/396 320/121 |
| 8,330,420 B2* | 12/2012 | Kim | ............... | H02J 7/0016 320/120 |
| 8,358,032 B2* | 1/2013 | Oga | ............... | H02M 3/158 320/117 |
| 8,378,623 B2* | 2/2013 | Kusch | ............... | B60L 58/20 320/104 |
| 8,436,580 B2* | 5/2013 | Tai | ............... | H02J 7/0024 320/117 |
| 8,466,657 B2* | 6/2013 | Buono | ............... | H02J 7/0019 320/120 |
| 8,829,722 B2* | 9/2014 | Kusch | ............... | H02J 7/1423 307/82 |
| 8,981,727 B2* | 3/2015 | Kusch | ............... | B60L 50/40 320/167 |
| 8,994,327 B2* | 3/2015 | Kusch | ............... | B60L 53/14 320/109 |
| 9,399,407 B2* | 7/2016 | Zhou | ............... | B60W 10/08 |
| 9,758,047 B2* | 9/2017 | Hou | ............... | B60L 53/62 |
| 10,099,562 B2* | 10/2018 | Jin | ............... | B60L 58/24 |
| 10,391,864 B2* | 8/2019 | Patel | ............... | B60L 3/0046 |
| 10,407,004 B2* | 9/2019 | Harris | ............... | B60L 50/64 |
| 2018/0281608 A1* | 10/2018 | Albanna | ............... | H02J 7/06 |
| 2019/0126761 A1 | 5/2019 | Verbridge | | |
| 2019/0165713 A1 | 5/2019 | Namuduri et al. | | |

* cited by examiner

CHARGING ARCHITECTURE FOR RECONFIGURABLE BATTERY PACK USING SOLID-STATE AND CONTACTOR SWITCHES

INTRODUCTION

The present disclosure relates to a series charging architecture for an electric powertrain used for propelling a rechargeable mobile platform, e.g., a motor vehicle. Electric powertrains often include one or more polyphase/alternating current ("AC") rotary electric machines constructed from a wound stator and a magnetic rotor. The stator windings are connected to an AC-side of a power inverter, with a direct current ("DC")-side of the power inverter being connected to positive and negative rails of a DC voltage bus. When the electric machine functions as a traction motor, switching control of the ON/OFF states of individual semiconductor switches of the power inverter generates an AC output voltage at a level suitable for energizing the stator windings. The sequentially-energized stator windings produce a rotating magnetic field that ultimately interacts with a rotor field to produce machine rotation and motor output torque.

The DC voltage bus is electrically connected to a voltage source, which in mobile applications is typically embodied as a multi-cell battery pack. Voltage ratings of the types of battery packs currently used for energizing propulsion functions continue to increase to satisfy the demand for extended electric driving ranges. Battery charging infrastructure and associated charging methodologies likewise continue to evolve. For instance, some emerging DC fast-charging ("DCFC") stations are capable of providing charging voltages of 800V or more, while older "legacy" DCFC stations may be capable of providing lower charging voltages, for instance 400V. In order to accommodate a wide range of possible charging voltages, some battery systems utilize multiple battery packs in lieu of a unitary battery. The individual battery packs of some battery systems, for instance, may be selectively connected in parallel during propulsion operations, and the reconfigured to a series connection during high-voltage charging operations, with the series connection of such a battery system configuration enabling utilization of higher charging voltages.

SUMMARY

A battery system is described herein that is configured for powering a rotary electric machine aboard a mobile platform. The battery system includes a multi-pack battery pack that is connected to positive and negative bus rails of a direct current ("DC") voltage bus. A switching control circuit has multiple electrical switches, including a mechanical contactor switch that automatically closes to connect the battery packs in series, e.g., to enable rapid charging via a DC fast-charging ("DCFC") station. The contactor switch opens when the battery packs are to be operated in parallel.

Additionally, the battery system includes a solid-state switch embodied as a unidirectional or bidirectional semiconductor switch. The solid-state switch is connected in series with the contactor switch and controlled according to a method as described below. Execution of the method provides the battery system with fault detection capabilities and switch redundancy in a series connection path between the battery packs. Control of the solid-state switch thus protects the battery pack during a short-circuit condition that might result from welding of contactor leads of the contactor switch, or an over-current condition that could lead to such a short-circuit condition if left unabated.

As part of the present control approach, a controller executes instructions embodying the method. This allows the controller to automatically detect a fault condition and quickly interrupt current flow between the battery packs, with both control actions achieved via operation of the above-noted solid-state switch. The present approach and related circuit topology may be used to preempt undesirable contactor welding during an over-current condition by detecting a voltage across the contactor switch. The controller uses such a detected voltage to identify the fault condition, and to thereafter initiate necessary protective measures, including opening the solid-state switch.

In an illustrative embodiment, the battery system includes first and second battery packs connected to positive and negative DC voltage bus rails, a contactor switch connected between the first and second battery packs, a solid-state switch in series with the contactor switch, and a controller. The controller, which is in communication with the contactor switch and the solid-state switch, is configured to determine characteristic values of each of the contactor and solid-state switches, including a respective temperature, voltage, and current value. The controller is also configured to detect an electrical fault condition of the contactor switch using the characteristic values, and to execute a control action in response to the electrical fault condition. The control action includes opening the semi-conductor switch to interrupt a flow of current between the first and second battery packs.

The solid-state switch may have a gate terminal and first and second voltage terminals. The characteristic values of the solid-state switch may include a gate terminal voltage, a gate terminal current, a voltage across the voltage terminals, and a current through the solid-state switch.

The solid-state switch may include a temperature sensor configured to measure the temperature of the solid-state switch as part of the characteristic values of the semiconductor switch.

Possible embodiments of the solid-state switch include Silicon, Silicon carbide, Gallium nitride, or Gallium oxide switches. The solid-state switch may be optionally configured as a bi-directional switch.

The controller may be configured to detect the electrical fault condition by comparing the voltage across the contactor switch to a reference voltage. The electrical fault condition may be a short-circuit or an over-current condition.

One or both of the battery packs may be connected to a rotary electric machine via a power inverter module. The controller in such an embodiment may command torque from the rotary electric machine to a driven load after opening the semi-conductor switch.

The driven load in some embodiments is a road wheel of a motor vehicle.

A mobile platform is also disclosed herein that includes road wheels connected to a body, an electrical load including a rotary electric machine configured to power the road wheels and thereby propel the mobile platform, a battery pack connected to positive and negative bus rails, and having multiple battery packs selectively connectable to the electrical load. The mobile platform additionally includes a contactor switch connected between the first and second battery packs, a solid-state switch in series with the contactor switch, and a controller configured as set forth above.

A method is also disclosed for use in the above-noted battery system. An embodiment of the method includes determining, via a controller, characteristic values of a solid-state switch and a contactor switch positioned in series with each other between the first and second battery packs, including determining a temperature, voltage, and current value of the solid-state switch and the contactor switch, respectively. The method also includes detecting a predetermined electrical fault condition of the contactor switch via the controller using the characteristic values. In this embodiment, the electrical fault condition is a short-circuit condition or an over-current condition. In response to the electrical fault condition, the method includes opening the semi-conductor switch via the controller to thereby interrupt a flow of current between the first and second battery packs.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
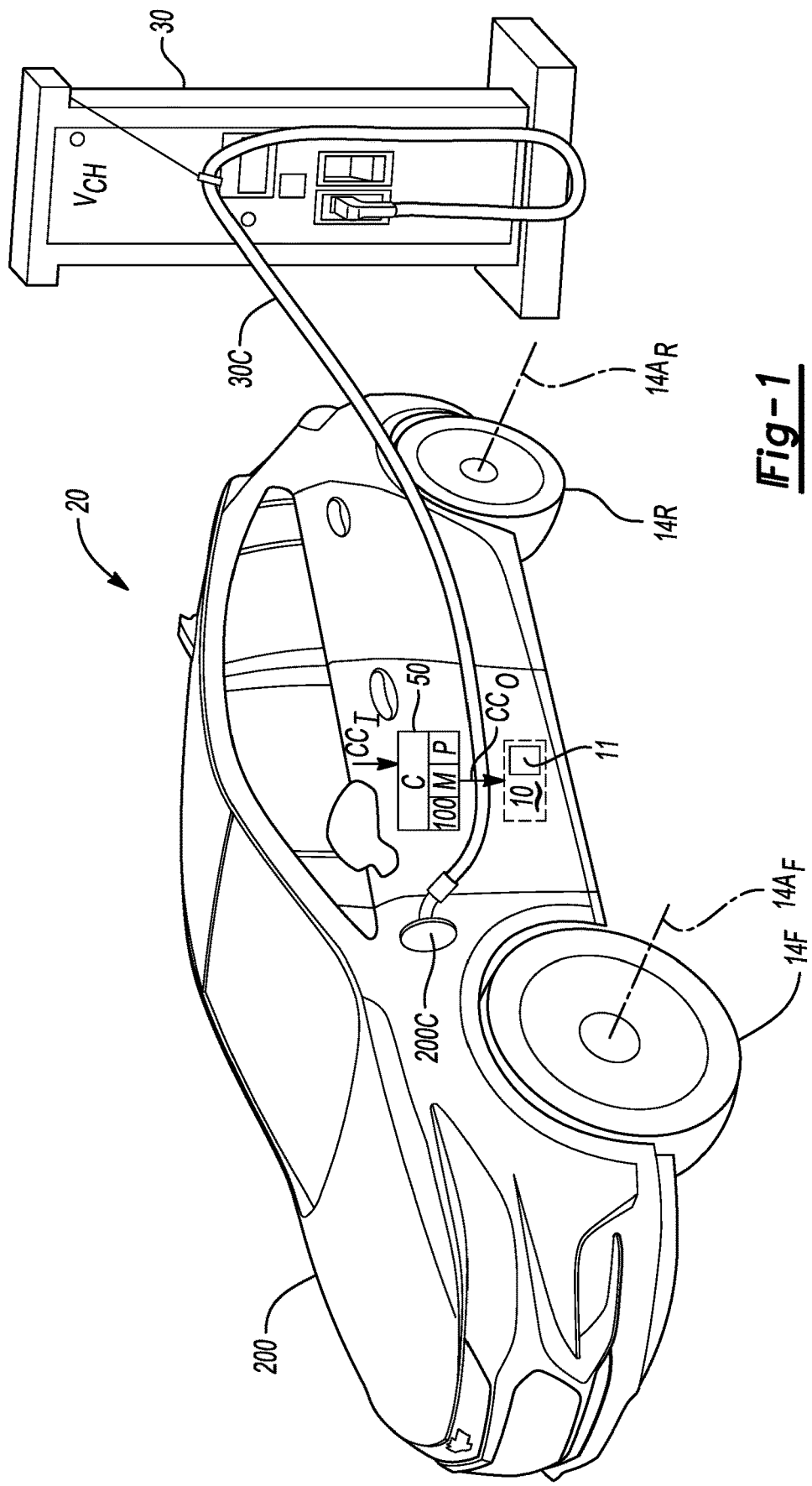
FIG. 1 is a schematic illustration of an example motor vehicle undergoing a direct current fast-charging ("DCFC") operation.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, an electric powertrain 10 of a mobile platform 20 includes a multi-pack battery system 11. In the depicted representative embodiment, the electric powertrain 10 powers electric propulsion functions of the mobile platform 20, which is a motor vehicle in the depicted exemplary embodiment. As used herein, the term "exemplary" describes non-limiting example configurations illustrating possible implementations of the present teachings that are not necessarily advantageous or preferred over other possible implementations. The described solutions may be used in rechargeable electrical systems, such as but not limited to mobile power plants, robots, conveyor or transport platforms, etc. When used in vehicular applications, the present teachings may be extended to various types of vehicles, including but not limited to aircraft, marine vessels, and rail vehicles. For illustrative consistency, the mobile platform 20 of FIG. 1 will be described hereinafter in the context of a motor vehicle without limiting the present teachings to vehicular applications in general or to motor vehicles in particular.

The mobile platform 20 is shown undergoing a direct current fast-charging ("DCFC") operation in which the battery pack 11 is electrically connected to an off-board DCFC station 30, e.g., via a vehicle charging port 200C connected to a body 200 of the mobile platform 20 that is internally connected to a DC charge connector (not shown) using a length of high-voltage charging cable 30C. Although not shown in FIG. 1, the end connection of the charging cable 30C may be an SAE J1772 or other suitable country-specific or application-specific charge coupler or plug.

Figure 3:
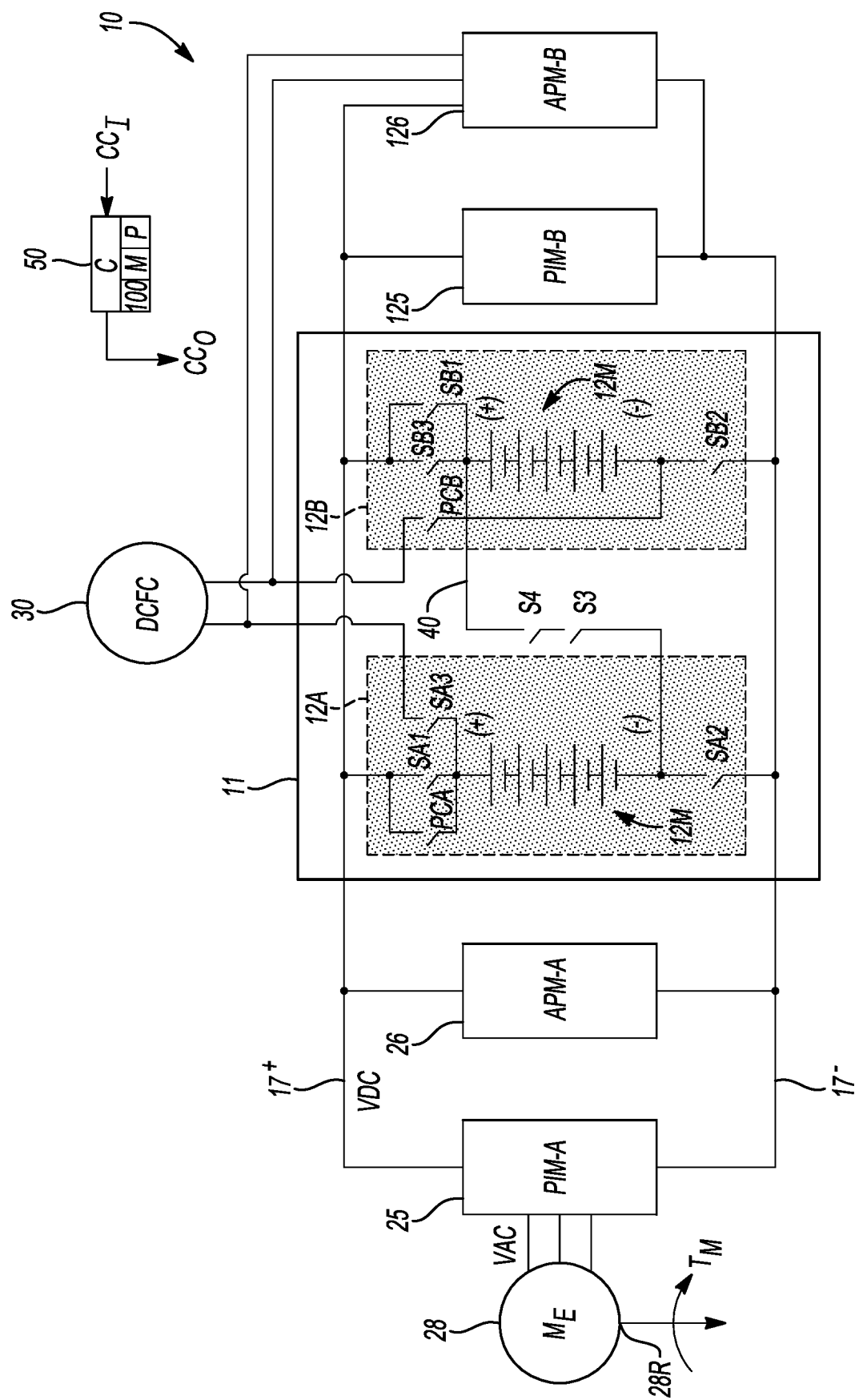
FIG. 3 is a schematic circuit diagram of a battery system having the series-connected battery packs of FIG. 2B and connected electrical loads during a DCFC operation.

The mobile platform 20 in the illustrated embodiment includes front and rear road wheels 14F and 14R, respectively. The front and rear road wheels 14F and 14R may be connected to separate front and rear drive axles $14A_F$ and $14A_R$. In an all-wheel drive ("AWD") embodiment, the drive axles $14A_F$ and $14A_R$ may be individually powered by separate rotary electric machines (not shown) each functioning as electric traction motors via corresponding power inverter module 25 or 125 as shown in FIG. 3 and described below.

The battery pack 11, which may use a lithium ion, zinc-air, nickel-metal hydride, lead acid, or other application-suitable battery chemistry, is selectively recharged via a DCFC charging voltage ("$V_{CH}$") from the off-board DCFC station 30. When the mobile platform 20 is in operation, modulated switching control is performed by a controller 50 via control signals (arrow $CC_O$) to ultimately energize an electric machine 28 (see FIG. 3) to generate and deliver motor torque to the road wheels 14F and/or 14R, and to thereby propel the mobile platform 20 and/or to perform other useful work. Thus, the battery pack 11 and the controller 50 together form a battery system, with other possible components such as thermal management/cooling and power electronic hardware omitted for illustrative clarity.

The controller 50 includes a processor (P) and memory (M), with the memory (M) including application-suitable amounts of tangible, non-transitory memory, e.g., read only memory, whether optical, magnetic, flash, or otherwise. The controller 50 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 50 is programmed to execute instructions embodying a short-circuit/over-current fault detection and handling method 100, with the controller 50 receiving input signals (arrow $CC_I$) indicative of a drive-requested or autonomously-requested charging mode of the battery pack 11 and, in response, outputting the control signals (arrow $CC_O$) to the battery pack 11.

Some of the input signals (arrow $CC_I$) may be determined during a DCFC operation as part of ongoing communication between the controller 50 and the DCFC station 30 of FIG. 1, as will be appreciated by those of ordinary skill in the art. Such communication occurs upon connection of the mobile platform 20 to the DCFC station 30, such as when the DCFC station 30 communicates its maximum charging voltage ($V_{CH}$) to the controller 50. In a drive/propulsion mode, an operator-requested or autonomously-determined propulsion request may cause the controller 50 to establish a parallel-connected ("P-connected") configuration of the battery pack 11. During certain DCFC operations, the controller 50 may selectively reconfigure the battery pack 11 to a series-connected ("S-connected") configuration to take advantage of the charging voltage $V_{CH}$, as will now be described with reference to FIGS. 2A and 2B.

Figure 2B:
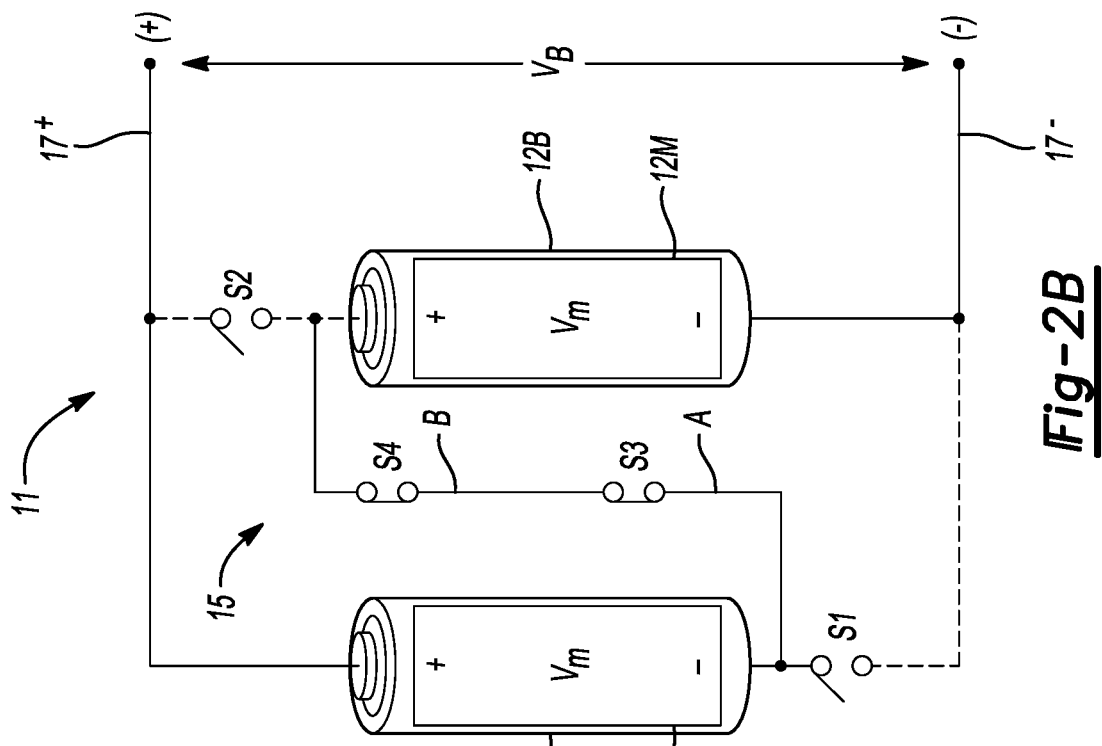
FIGS. 2A and 2B are schematic prior art circuit diagrams of a pair of battery packs connected in parallel and in series, respectively, with a contactor and a solid-state switch connected in series between the battery packs.
Figure 2A:
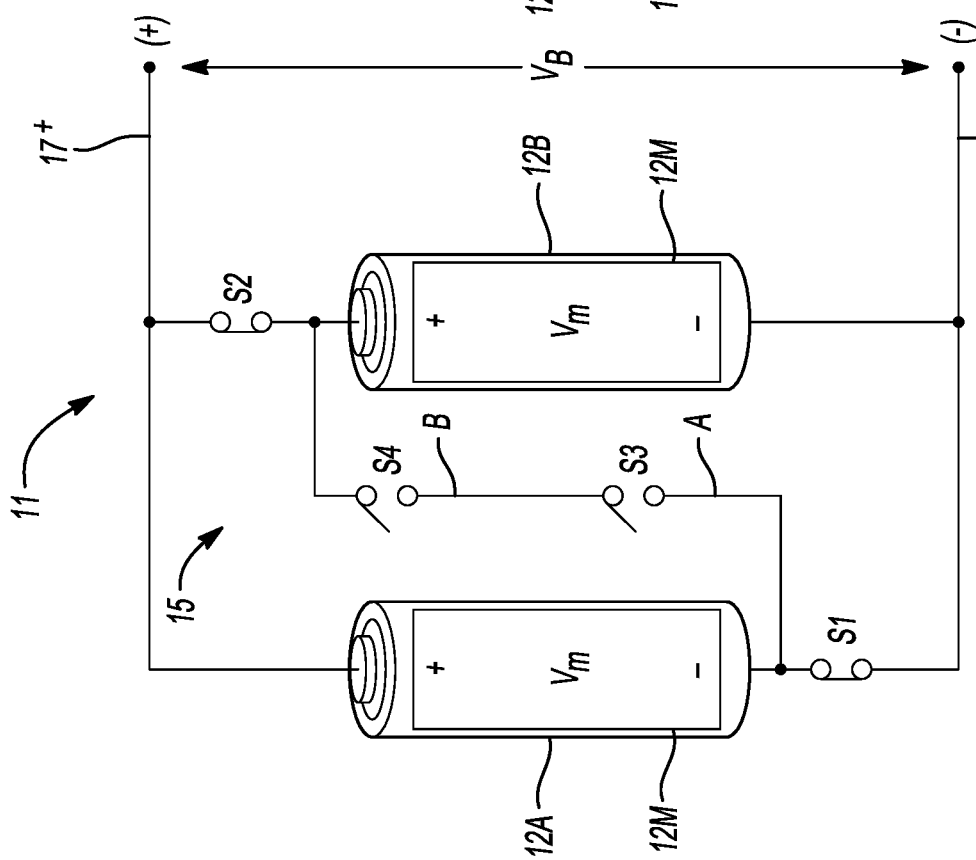

Referring to FIG. 2A, in a simplified embodiment the battery system 11 may be part of a rechargeable energy storage system that is constructed from two or more battery packs 12A and 12B each having an associated battery module 12M in the form of interconnected battery cells, cell sense circuitry, etc. Additional battery packs may be used in other embodiments, with the two battery packs 12A and 12B used hereinafter solely for illustrative consistency and simplicity. The battery packs 12A and 12B are depicted in a P-connected configuration, with the battery modules 12M in each battery pack 12A and 12B having a corresponding module voltage $V_m$, and with the battery pack voltage $V_B$ being equal to the module voltage $V_m$.

In an illustrative and non-limiting embodiment, the module voltage $V_m$ may be in the range of about 400-500V. The charging voltage $V_{CH}$ from the DCFC station 30 of FIG. 1 may either be in the same range, or the charging voltage $V_{CH}$ may be higher, for instance 800-1000V, with other battery and charging voltage levels also being usable within the scope of the disclosure. Thus, in the P-connected configuration of FIG. 2A the battery system 11 has a battery voltage $V_B$ defined by the potential difference between positive and negative DC bus rails 17⁺ and 17⁻, or more precisely the positive and negative terminals of the battery system 11, and that is equal to the module voltage $V_m$. In the S-connected configuration of FIG. 2B, however, the battery voltage $V_B$ is a multiple of the module voltage $V_m$, with the multiple being the number of S-connected battery packs used in the construction of the battery system 11.

A switching control circuit 15 is constructed from multiple switches. For the purpose of illustrating the reconfigurable P-connected/S-connected capability of the battery system 11, such switches are shown in simplified form as switches S1, S2, S3, and S4. Each of the depicted switches may be embodied as multiple switches in an actual implementation, e.g., as shown in FIG. 3, and therefore the topology of FIGS. 2A and 2B is intended solely as an illustration of the reconfigurable nature of the battery pack 11.

Switches S1, S2, and S3 are typically configured as mechanical switches, i.e., spring-biased contactors having an ON/conducting state when closed and an OFF/non-conducting state when opened. Switch S1 is connected between the negative (−) terminal of battery module 12M of battery pack 12A and the negative DC bus rail 17⁻, while switch S2 is connected between the positive (+) terminal of the battery module 12M of battery pack 12B and a positive DC bus rail 17⁺. Switch S3 in turn is disposed between the battery packs 12A and 12B. Specifically, one side (A) of switch S3 is connected between switch S1 and the negative (−) terminal of battery module 12M of battery pack 12A, with an opposing side (B) of the switch S3 being connected between the positive (+) terminal of the battery module 12M of battery pack 12B and switch S2.

When the switch S3 is opened and the switches S1 and S2 are closed, which is the case depicted in FIG. 2A, the battery packs 12A and 12B are connected in electrical parallel. Likewise, when switch S3 is closed and switches S1 and S2 are opened as shown in FIG. 2B, the battery packs 12A and 12B are connected in electrical series. The battery voltage VB therefore increases in FIG. 2B relative to the voltage level in FIG. 2A, and thus the battery system 11 is able to utilize a higher charging voltage. The ON/OFF state of switch S3 remains opposite to the ON/OFF state of switches S1 and S2 regardless of whether the battery packs 12A and 12B are in a P-connected or an S-connected configuration.

Figure 4A:
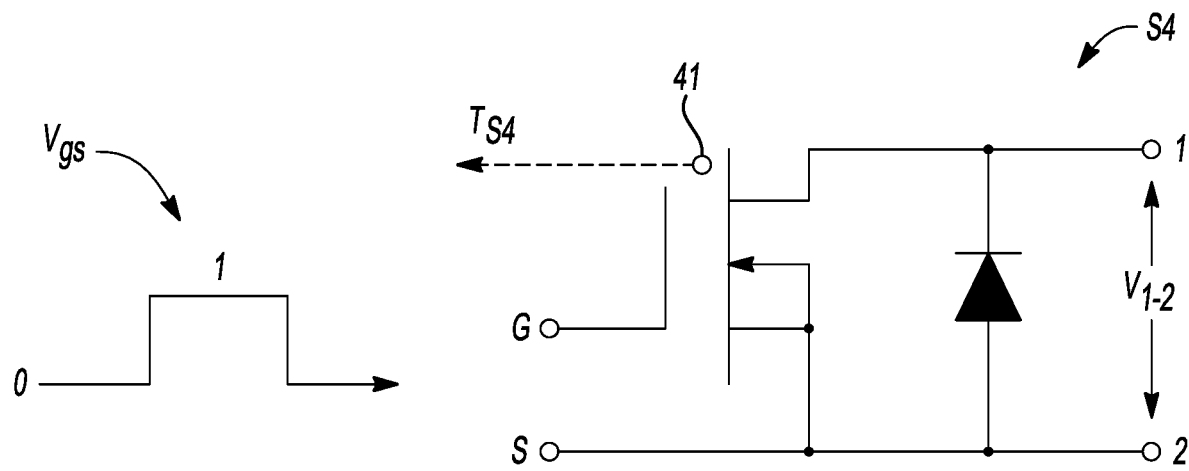
FIGS. 4A, 4B, and 4C are schematic circuit diagrams of alternative embodiments of the solid-state switch of FIG. 3.
Figure 4B:
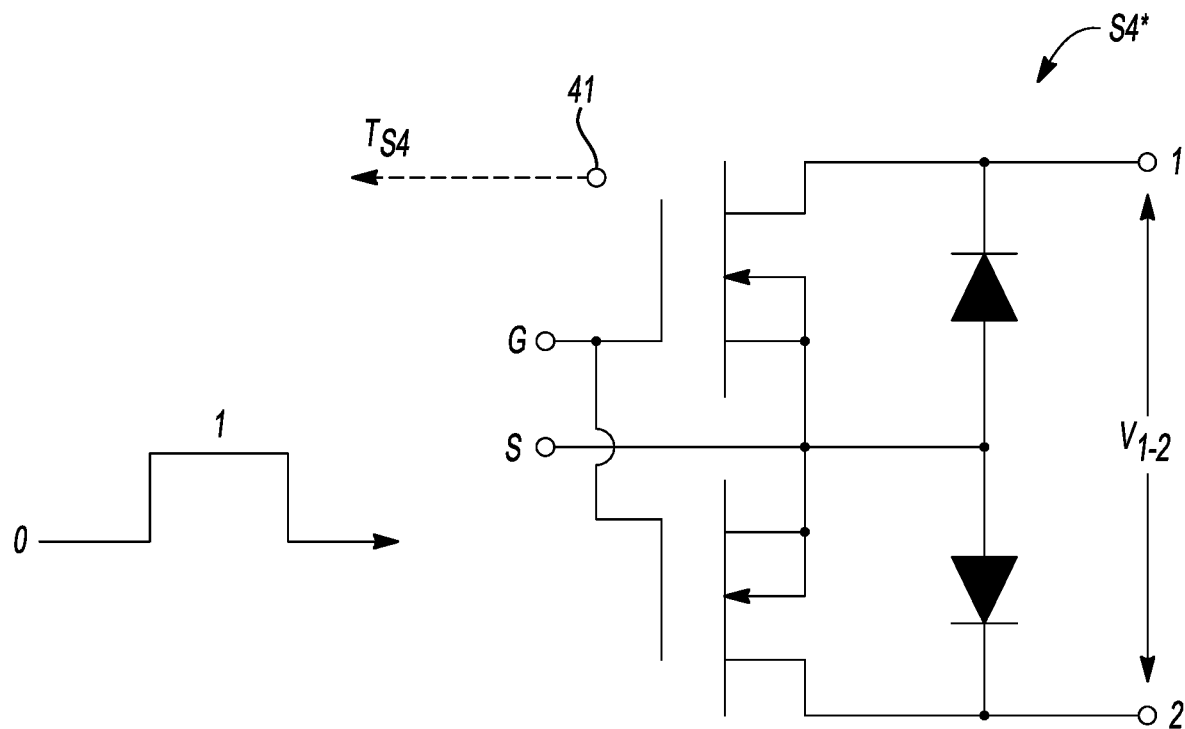
Figure 4C:
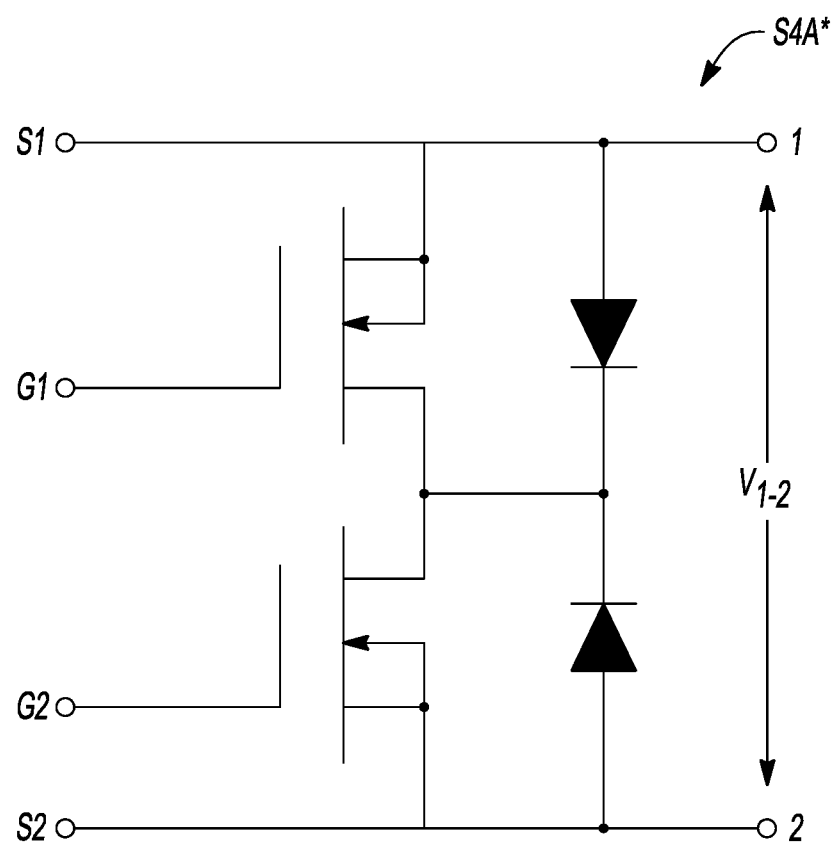

A characteristic of certain mechanical switches, and specifically the series contactor used to implement the series switch S3 between battery packs 12A and 12B, is the tendency to "bounce" momentarily upon opening as the contactor's conductive leads deflect from the conductors of the voltage bus before settling into good conductive contact therewith. As a result of the bounce effect, or due to mechanical shock, vibration, and other environmental factors, the time required to fully open or close a mechanical contactor may be relatively slow, and the contactor leads under over-current conditions can weld to the conductors of one or both voltage bus rails, and thus remain closed/short-circuited. The switch S4 is therefore configured as a solid-state switch, possible examples of which is depicted in FIGS. 4A-C, and placed in series with the switch S3. The switch S4 is in its various embodiments may be configured to block 900V or more when in an OFF state, e.g., 900V-1200V, and to conduct 500 A or more when in an ON state, and thus the hardware used to construct the switch S4 should be suitably robust to handle such levels. Function of the switch S4 will now be described with reference to the remaining Figures.

Operation of Solid-State Relay Switch S4

Figure 6:
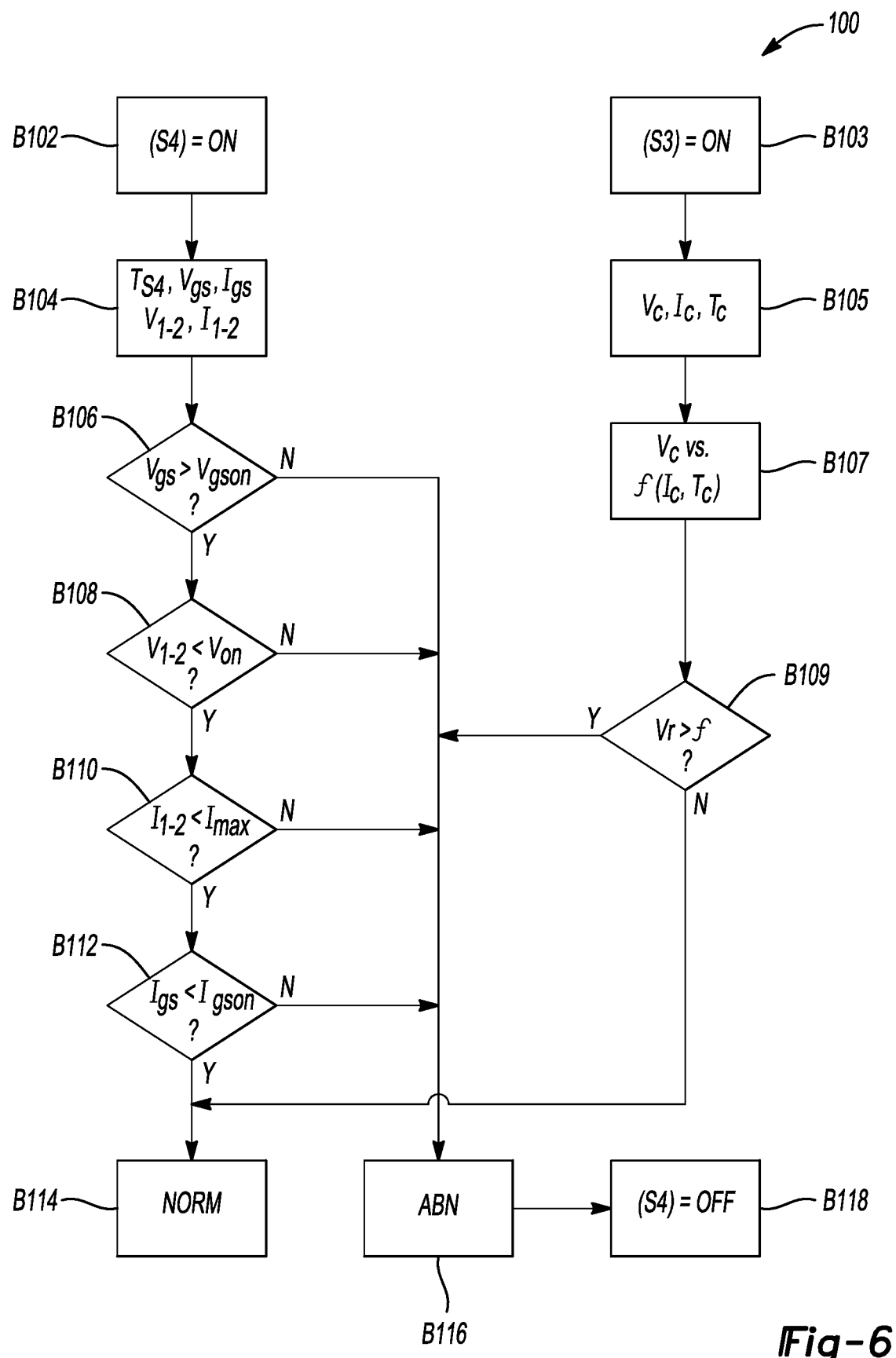
FIG. 6 is a flow chart describing a method for controlling the solid-state switch of FIGS. 2-5 according to the present disclosure.

Switch S4, which is a solid-state relay hereinafter referred to for simplicity as solid-state switch S4, is controlled according to the method 100, an example of which is shown in the flowchart of FIG. 6. Using the method 100, the controller 50 of FIGS. 1 and 3 is able to automatically detect short-circuit or over-current fault conditions in the series path between the battery packs 12A and 12B. In response to such a detected fault condition, the controller 50 is configured to rapidly open the solid-state switch S4, i.e., within a 2-3 microseconds (μs), instead of the opening time of several milliseconds or more in the case of switch S3, hereinafter referred to as the contactor switch S3. The present approach thereby adds switching function redundancy to the series path between the battery modules 12A and 12B.

The solid-state switch S4 provides a faster control response characterized by the absence of moving parts, with the solid-state switch S4 also not susceptible to welding. Unlike the contactor switch S3, the solid-state switch S4 also does not require resetting after opening. In the case of a short-circuit condition, for instance, the controller 50 simply turns off the solid-state switch S4 by disabling its control input, and quickly turns the solid-state switch S4 back on again when the control input is again enabled. Use of the solid-state switch S4 in series with the contactor switch S3 also enables limited propulsion in the event of a welded contactor switch S3, as the battery pack 11 remains reconfigurable to the P-connected configuration of FIG. 2A in spite of a welded condition of the contactor switch S3 that might otherwise preclude such an operating mode.

Referring to FIG. 3, the battery packs 12A and 12B shown schematically in FIGS. 2A and 2B may be used as part of the battery system 11. The battery system 11 is electrically connected to the DCFC station 30 and an electrical load, such as but not limited to the power inverter module ("PIM-A") 25 and ("PIM-B") 125, an auxiliary power module ("APM-A") 26 and ("APM-B") 126, an air conditioning control module (not shown), etc. The electrical load may also include one or more rotary electric machine, such as the electric machine ("M_E") 28 shown schematically at far left and connected to the PIM-A 25.

As will be appreciated by those of ordinary skill in the art, a power inverter such as the PIM-A 25 or PIM-B 125, produces a polyphase/AC voltage ("VAC") by way of internal switching control using pulse-width modulation, pulse-density modulation, or other suitable techniques. The AC voltage energizes phase windings of the electric machine 25 or 125 to thereby produce motor torque (arrow $T_M$) on a rotor 28R. While one electric machine 28 is shown in FIG. 3, the PIM-B 125 connected to battery pack 12B may likewise have a corresponding electric machine, e.g., to enable an all-wheel drive mode or to independently power one of the drive axles $14A_R$ or $14A_F$ of FIG. 1.

Various switches may be used to control the battery system 11 and embody the functions of the switches S1, S2, and S3 of FIGS. 2A and 2B. For instance, in the battery pack 12A as viewed from left-to-right, switches PCA, SA1, and SA3 may be connected to the positive bus rail $17^+$ and the positive terminal (+) of the battery module 12M for battery pack 12A. A switch SA2 may be connected between the negative terminal $17^-$ and the negative terminal (−) of the battery module 12M for battery pack 12A. Likewise in the battery pack 12B, again viewed from left-to-right, switches SB3, SB1, and PCB may be used between the positive bus rail $17^+$ and the positive terminal (+) of the battery module 12 of pack 12B, while a switch SB2 may be connected between the negative terminal $17^-$ and the negative terminal (−) of the battery module 12M of battery pack 12B.

In the labeling nomenclature used herein, "S" refers generally to "switch", regardless of construction, while "1", "2", and "3" are used as nominal switch identifiers. "A" and "B" refer to battery packs 12A and 12B, respectively. "PC" refers to "pre-charge", with the two pre-charge switches PCA and PCB used to ensure the voltage bus is sufficiently charged before opening the pre-charge switches PCA and PCB, as will be appreciated by those of ordinary skill in the art. Although omitted for illustrative simplicity, each pre-charge switch PCA and PCB is connected in series with a pre-charge resistor to help limit in-rush currents when the pre-charge switches PCA and PCB are initially closed.

Within the exemplary circuit topology of FIG. 3, and in particular within the series path extending between the battery packs 12A and 12B, the contactor switch S3 is in series with the solid-state switch S4 as noted above. The ON/OFF state of the solid-state switch S4 is controlled via the controller 50 or another control device to ensure that the contactor switch S3 does not serve as a single point of failure in the series path. The solid-state switch S4, being a highly controllable and rapidly resettable semiconductor device, may be embodied as a unidirectional device (FIG. 4A) or a bi-directional device (FIGS. 4B and 4C) possibly constructed from Silicon, Silicon carbide (SiC), Gallium nitride (GaN), Gallium oxide (GaO), etc., with FIGS. 4A and 4B illustrating possible hardware implementations of the solid-state switch S4.

Referring briefly to FIGS. 4A-4C, the ON/OFF state of the respective solid-state switch S4, S4*, or S4A* is controlled using a gate signal ($V_{gs}$), i.e., a voltage signal shown as a square wave. The gate signal ($V_{gs}$) has an OFF level ("0") and an ON level ("1"), with 0 and 1 being nominal ON/high and OFF/low commands as opposed to actual voltages. The voltage levels corresponding to the high/low values of the gate signals ($V_{gs}$) may vary depending on the configuration of the solid-state switches S4 and S4*. The solid-state switches S4, S4*, and S4A* may have an integrated temperature sensor 41 (omitted from FIG. 4C for simplicity), e.g., a thermistor, configured to measure a temperature of the solid-state switch S4, S4*, or S4A* as arrow $T_{S4}$, and to report the measured temperature to the controller 50. Additionally, the solid-state switches S4, S4*, or S4A* have voltage terminals labeled 1 and 2, with a switch voltage "$V_{1-2}$" being the potential difference between the terminals 1 and 2. The controller 50 is thus apprised of temperature and voltage, as well as current across the switch S4, S4*, or S4A* and control values such as the gate signal ($V_{gs}$) as part of the method 100, as described below with reference to FIG. 6. In the various FIGS. 4A-4C, the source terminal is labeled S, S1, or S2, and the gate terminal is labeled G, G1, or G2, as will be appreciated by those of ordinary skill in the art of semiconductor switch hardware.

Figure 5:
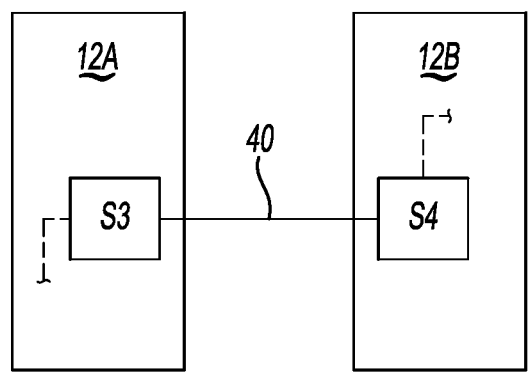
FIG. 5 is a schematic circuit diagram of a portion of the battery system shown in FIG. 3 according to another embodiment.

FIGS. 3 and 5 show optional locations for the contactor switch S3 and the solid-state switch S4. FIG. 3, for instance, shows the battery modules 12M and switches PCA, SA1, SA2, SA3, PCB, SB1, SB2, and SB3 of a battery disconnect unit (not shown) as constituent parts of the battery packs 12A and 12B. The switches S4 variously embodied as the uni-directional configuration of FIG. 4A or the bi-directional configurations of FIGS. 4B and 4C, may be positioned in series between battery packs 12A and 12B, e.g., on a length of cable 40 extending between the battery packs 12A and 12B, such that neither of the switches S3 and S4 is located within a given one of the battery pack 12A or 12B. FIG. 5 depicts an alternative configuration in which the contactor switch S3 is integral to/located fully within the battery pack 12A and the solid-state switch S4 is integral to/located fully within the battery pack 12B.

In either configuration, during a short-circuit or over-current condition the solid-state switch S4 is used to help detect and interrupt current flowing in the series path between the battery packs 12A and 12B, and to turn off the solid-state switch S4 within a few microseconds. The alternative embodiment of FIG. 5 eliminates the possibility of an open high-voltage line in the battery pack 11 during a P-connected use case, as will be appreciated, and therefore may be advantageous in certain configurations.

FIG. 6 depicts a flow chart describing the method 100 according to an exemplary implementation, with the method 100 enabling control of the above-described solid-state switch S4 of FIGS. 3 and 4A or its bi-directional alternative embodiment S4* or S4A* of FIGS. 4B and 4C, respectively. Using the method 100, the controller 50 detects a short-circuit condition, e.g., when leads of the series contactor switch S3 are welded closed, or an over-current condition in which such welding is likely to result. In response, the controller 50 interrupts current flow between the battery packs 12A and 12B via control of the solid-state switch S4. The method 100 proceeds by using a voltage across the contactor switch S3 to help identify the fault and take protective control actions, e.g., by initiating a shutdown of the battery system 11 or a default propulsion mode conducted using the voltage of one of the battery packs 12A or 12B. The evenly-numbered blocks of method 100 run concurrently with the oddly-numbered blocks to diagnose proper functioning of the contactor switch S3, and to determine precisely when to open the solid-state switch S4.

Beginning with block B102 of FIG. 6, the controller 50 sets the solid-state switch S4 to an ON state, i.e., a closed/conducting state, and then proceeds to block B104.

Block B103, which is analogous to block B102, includes setting the contactor switch S3 to an ON state, i.e., closed/conducting, and then proceeds to block B105.

At block B104, the controller 50 reads or receives characteristic values of the solid-state switch S4, including its temperature ($T_{S4}$), the gate signal ($V_{gs}$), and the gate current ($I_{gs}$), as well as the voltage ($V_{1-2}$) and corresponding current ($I_{1-2}$) respectively across and through the solid-state switch S4. The method 100 then proceeds to block B106.

At block B105, the controller 50 next reads or receives characteristic values of the contactor switch S3, including its temperature ($T_c$), voltage ($V_c$), and current ($I_c$). The method 100 then proceeds to block B107.

Block B106 includes comparing the gate signal ($V_{gs}$) from block B104 to a calibrated ON voltage threshold ($V_{on}$), via the controller 50, for instance using a comparator circuit. The method 100 proceeds to block B108 when the gate signal ($V_{gs}$) exceeds the threshold, i.e., when $V_{gs}>V_{on}$. Otherwise, the method 100 proceeds to block B116.

Block B107 includes comparing the voltage ($V_c$) across the contactor switch S3 to a predetermined current and temperature-dependent function, i.e., f ($I_c$, $T_c$). As will be appreciated, the resistance across a given mechanical switch, such as the contactor switch S3, may change with time and with variations in switch temperature. Thus, solving the function may include deriving an expected or acceptable voltage or voltage range, with the controller 50 storing such a value or range in memory (M) for reference when executing block B107. The method 100 then proceeds to block B109.

Block B108 includes comparing the voltage ($V_{1-2}$) across the solid-state switch S4 to the ON threshold ($V_{on}$), via the controller 50. The method 100 proceeds to block B110 when $V_{1-2}>V_{on}$. Otherwise, the method 100 proceeds to block B116.

Block B109 of FIG. 6 includes comparing the contactor voltage ($V_c$) to the function-derived voltage from block B107 to determine whether the present contactor voltage is too high relative to an expected value indicative of a short-circuit or over-current fault. The method 100 proceeds to block B116 when the contactor voltage ($V_c$) exceeds the derived value, i.e., $V_r>f$ ($I_c,T_c$). The method 100 otherwise proceeds to block B114.

Block B110 includes comparing the current ($I_{1-2}$) across the solid-state switch S4 to a calibrated maximum threshold ($I_{max}$), e.g., 600A. The method 100 proceeds to block B112 when $I_{1-2}<I_{max}$. Otherwise, the method 100 proceeds to block B116, with the condition of $I_{1-2}>I_{max}$ being indicative of a short-circuit or over-current fault.

Block B112 includes comparing the current ($I_{gs}$) delivered to the gate of the solid-state switch S4 to a calibrated ON threshold ($I_{on}$) via the controller 50, e.g., 1 µA. The method 100 proceeds to block B114 when $I_{gs}<I_{on}$. Otherwise, the method 100 proceeds to block B116.

At block B114, the controller 50 records a diagnostic code indicative of a passing or normal ("NORM") test result. Such a result is considered herein to be indicative of a no-fault condition, or at least an absence of a short-circuit or over-current condition. The method 100 may resume anew with block B102, with method 100 executed in a loop during operation of the battery pack 11.

At block B116, the controller 50 of FIG. 1 records a diagnostic code indicative of an abnormal ("ABN") test result that may be indicative of a short-circuit or over-current condition. The method 100 then proceeds to block B118.

Block B118 includes executing a control action in response to the setting of the abnormal diagnostic code in block B116. As part of such a control action, the controller 50 may transmit a control signal to the gate terminal of the solid-state switch S4, which in turn causes the solid-state switch S4 to immediately open. Given the semiconductor construction of the solid-state switch S4, the switch S4 opens within less than 2 µs, and does so without the above-noted bouncing of moving parts. Thus, even with a welded contactor lead of the contactor switch S3, the battery packs 12A and 12B are no longer connected in series due to operation of the solid-state switch S4. The controller 50 may thereafter discontinue charging operations, and may connect the battery packs 12A and 12B via the schematic switches S1 and S2 of FIG. 2A, e.g., the switches SA1, SA2, SA3, SB1, SB2, and SB3 of FIG. 3.

The method 100 therefore is used to control the solid-state switch S4 in the series path between battery packs 12A and 12B under conditions that may otherwise result in a loss of propulsion functions, e.g., due to a welded contactor in the series contactor switch S3 of FIG. 3. The solid-state switch S4 provides a layer of redundancy, with a level of controllability not attainable using simple binary ON/OFF mechanical relays, contactors, or other mechanical switches. The controller 50 is thus able to detect a short-circuit or over-current condition and thereafter quickly interrupt current flow between the battery packs 12A and 12B. As the solid-state switch S4 does not require resetting unlike a mechanical contactor, the controller 50 is able to quickly resume normal operations after the fault clears. These and other benefits will be readily appreciated by one of ordinary skill in the art in view of the foregoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A battery system comprising:
   positive and negative direct current ("DC") voltage bus rails;
   first and second battery packs each connected to the positive and negative DC voltage bus rails;
   a contactor switch connected between the first and second battery packs;
   a solid-state switch in series with the contactor switch; and
   a controller in communication with the contactor switch and the solid-state switch, wherein the controller is configured to determine values of the solid-state switch and the contactor switch which includes a temperature, voltage, and current value of the solid-state switch and the contactor switch, respectively, to detect an electrical fault condition of the contactor switch using the values, and to execute a control action in response to the electrical fault condition, including opening the solid-state switch to thereby interrupt a flow of current between the first and second battery packs.

2. The battery system of claim 1, wherein the solid-state switch has a gate terminal and first and second voltage terminals, and wherein the values of the solid-state switch include a gate terminal voltage, a gate terminal current, a voltage across the voltage terminals, and a current through the solid-state switch.

3. The battery system of claim 1, wherein the solid-state switch includes a temperature sensor configured to measure the temperature of the solid-state switch as part of the values of the solid-state switch.

4. The battery system of claim 1, wherein the solid-state switch is a Silicon, Silicon carbide, Gallium nitride, or Gallium oxide switch.

5. The battery system of claim 4, wherein the solid-state switch is a bi-directional switch.

6. The battery system of claim 1, wherein the controller is configured to detect the electrical fault condition by comparing the voltage across the contactor switch to a reference voltage, and wherein the electrical fault condition is a short-circuit or an over-current condition.

7. The battery system of claim 1, wherein one or both battery modules is connected to a rotary electric machine via a power inverter module, and wherein the controller is configured to command torque from the rotary electric machine to a driven load after opening the solid-state switch.

8. The battery system of claim 7, wherein the driven load is a road wheel of a motor vehicle.

9. A mobile platform comprising:
a body;
road wheels connected to the body;
an electrical load including a rotary electric machine configured to power the road wheels and thereby propel the mobile platform;
a battery pack connected to positive and negative bus rails, and having multiple battery packs selectively connectable to the electrical load, wherein each of the battery packs has a battery module with a module voltage;
a contactor switch connected between the battery packs;
a solid-state switch in series with the contactor switch; and
a controller in communication with the contactor switch and the solid-state switch, wherein the controller is configured to determine values of the solid-state switch and the contactor switch which includes a temperature, voltage, and current value of the solid-state switch and the contactor switch, respectively, to detect an electrical fault condition of the contactor switch using the values, and to execute a control action in response to the electrical fault condition, including opening the solid-state switch to thereby interrupt a flow of current between the battery packs.

10. The mobile platform of claim 9, wherein the mobile platform is a motor vehicle.

11. The mobile platform of claim 10, wherein a battery voltage of each of the battery packs is greater than 400V.

12. The mobile platform of claim 9, wherein the solid-state switch has a gate terminal and first and second voltage terminals, and wherein the values of the solid-state switch include a gate terminal voltage, a gate terminal current, a voltage across the voltage terminals, and a current through the solid-state switch.

13. The mobile platform of claim 9, wherein the solid-state switch includes a temperature sensor configured to measure the temperature of the solid-state switch as part of the values of the solid-state switch.

14. The mobile platform of claim 9, wherein the solid-state switch is a Silicon, Silicon carbide, Gallium nitride, or Gallium oxide switch.

15. The mobile platform of claim 14, wherein the solid-state switch is a bi-directional switch.

16. The mobile platform of claim 9, wherein the controller is configured to detect the electrical fault condition by comparing the voltage across the contactor switch to a reference voltage, and wherein the electrical fault condition is a short-circuit or an over-current condition.

17. A method for use in a battery system having positive and negative direct current ("DC") voltage bus rails, first and second battery packs connected to the positive and negative DC voltage bus rails, the method comprising:
determining, via a controller, values of a solid-state switch and a contactor switch positioned in series with each other between the first and second battery packs, wherein determining values of the solid-state switch and the contactor switch includes a temperature, voltage, and current value of the solid-state switch and the contactor switch, respectively;
detecting a predetermined electrical fault condition of the contactor switch via the controller using the values, wherein the electrical fault condition is a short-circuit condition or an over-current condition; and
in response to the electrical fault condition, opening the solid-state switch via the controller to thereby interrupt a flow of current between the first and second battery packs.

18. The method of claim 17, wherein the solid-state switch has a gate terminal and first and second voltage terminals, the values of the solid-state switch include a gate terminal voltage, a gate terminal current, a voltage across the voltage terminals, and a current through the solid-state switch, and the solid-state switch includes a temperature sensor configured to measure the temperature of the solid-state switch as part of the values of the solid-state switch.

19. The method of claim 17, wherein detecting the predetermined electrical fault condition includes comparing the voltage across the contactor switch to a reference voltage, and wherein the electrical fault condition is a short-circuit or an over-current condition.

20. The method of claim 17, further comprising:
using one or both of the battery packs to power a driven load via a rotary electric machine after opening the solid-state switch.

* * * * *